United States Patent
Stachel (10) Patent No.: US 9,449,185 B2
(45) Date of Patent: Sep. 20, 2016

(54) EXTENSIBLE AND/OR DISTRIBUTED AUTHORIZATION SYSTEM AND/OR METHODS OF PROVIDING THE SAME

(75) Inventor: Michael Stachel, Wadern (DE)

(73) Assignee: SOFTWARE AG, Darmstadt (DE)

( * ) Notice: Subject to any disclaimer, the term of this patent is extended or adjusted under 35 U.S.C. 154(b) by 303 days.

(21) Appl. No.: 13/328,209

(22) Filed: Dec. 16, 2011

(65) Prior Publication Data

US 2013/0160108 A1    Jun. 20, 2013

(51) Int. Cl.
*G06F 21/00* (2013.01)
*G06F 21/62* (2013.01)
*G06F 21/31* (2013.01)

(52) U.S. Cl.
CPC ........... *G06F 21/6218* (2013.01); *G06F 21/31* (2013.01)

(58) Field of Classification Search
CPC .............................. G06F 21/6218; G06F 21/31
See application file for complete search history.

(56) References Cited

U.S. PATENT DOCUMENTS

2005/0097351 A1* 5/2005 Patrick et al. ................ 713/200
2009/0094682 A1* 4/2009 Sage et al. ........................ 726/4

OTHER PUBLICATIONS

Spring Source. Spring Security—Main Features [retrieved Dec. 16, 2011]. http://static.springsource.org/spring-security/site/features.html.
Apache Shiro—Features. [retrieved Dec. 16, 2011]. http://shiro.apache.org/features.html.
Oracle. The Java EE 5 Tutorial—For Sun Java System Application Server 9.1 [retrieved Dec. 16, 2011]. http://docs.oracle.com/javaee/5/tutorial/doc/javaeetutorial5.pdf.

\* cited by examiner

*Primary Examiner* — Brandon Hoffman
*Assistant Examiner* — Nega Woldemariam
(74) *Attorney, Agent, or Firm* — Nixon & Vanderhye, P.C.

(57) ABSTRACT

In certain example embodiments, an extensible and/or distributed security system is provided. In certain example embodiments the security system provides authorization to a resource of a first application. In the first application, a security context is created and a client is authenticated to the first application. A request is accepted in the first application to access at least one resource. The first application communicates with an authorization application to determine authorization to the at least one resource. In the authorization application, an authorization process is executed which communicates with another application that defines a step of the authorization process for this resource. Based on that step, it is determined whether the first application allows access to the at least one resource for the client.

31 Claims, 7 Drawing Sheets

EXTENSIBLE AND/OR DISTRIBUTED AUTHORIZATION SYSTEM AND/OR METHODS OF PROVIDING THE SAME

FIELD OF THE INVENTION

Certain example embodiments described herein relate to extensible and/or distributed security systems. More particularly, certain example embodiments relate to extensible and/or distributed authorization techniques for use in connection with computer systems.

BACKGROUND AND SUMMARY OF EXAMPLE EMBODIMENTS OF THE INVENTION

Computer applications are becoming increasingly prevalent in society. Pencil and paper, mechanical systems, and others have been replaced by electronics that are controlled by computer programs. These computer applications now handle financial information, automobile assembly processes, power systems, and many other types of functionality, systems, and processes.

At a basic level, computer applications include processes (e.g., approval of a financial transaction, steering of a robotic arm in an automobile assembly line) and data (e.g., how much is a transaction, who will approve a transaction, coordinates and/or velocity for how a robotic arm moves). With such applications both the processes that operate and the data that is being operated on are of value and should be protected.

As the prevalence of computer applications has grown, the need for techniques to secure such applications also has grown. Security can be broken down into two sub-disciples, namely, authentication and authorization.

Authentication may be performed to verify that the person (or process) is who it says it is. For example, a person that logs into a website authenticates that that person is that user. This is a fairly straightforward form of authentication, as it may be possible that the person logging in is not, in fact, the person "associated" with that account. Accordingly, more stringent forms of authentication may be employed (e.g., such as 2-factor authentication) in order to increase the reliability that the person is who he/she says he/she is.

A second aspect of security is called authorization, which may be used to grant access to resources (e.g., processes, data, etc.). One element of authorization that relates to how such access is granted is known as a security context. Security contexts can include information related to the user, assigned roles, permission data that may be provided when the user authenticates, etc. These contexts can then be used to determine whether the user (or other entity) associated with the context is authorized to interact with a given piece of data (or process).

Given that determining what users (and their associated contexts) can access may be application-specific for the resources involved, in certain instances it may not be possible to provide an abstract authorization scheme (e.g., a framework). A newly developed application may include application-specific logic regarding how/what users or objects can access or view the processes and data of the application. For example, in a cluster of applications in a cloud computing scenario, the applications that are sharing data may not have knowledge of other algorithms, processes, etc., that facilitate authorization of the use (or view) of such data.

Some existing frameworks work with authentication and authorization, for example:

1) Spring Security (formerly Acegi): The Spring framework provides first class collaboration with other parts of the Spring framework, a dependency injection pattern, and aspect oriented programming facilities. Both authentication and authorization capabilities on top of them are provided. Both are declarative (with XML) and stored in LDAP, RDBMS, or XML files. Authorization uses Access Control Lists (ACL). The ACLs are stored within client databases in a preconfigured schema that are installed on behalf of the customer. Authorization is implemented by annotating a method or calling the authorization API inside a method directly. The security context is provided through a static method and stored inside a thread local variable for distinction. This behavior sets a prerequisite that one request is always processed with one thread. The synchronization sink is the database, which means every application could read these ACLs and doing authorization.

2) JEE security: JEE includes the Java Authentication and Authorization Service (JAAS) based credentials that are managed by a central container. The credentials include users and roles and are used for authorization through programmatic or annotation techniques. An authorization property file is provided which holds entries written in a domain specific language (DSL) that describes granting rules of assets with a predefined permission set. The rules are applied declaratively and executed automatically through the provided security manager inside the containers.

3) Apache Shiro: This framework provides authorization on a permission level. Users can describe permissions, store the permissions as properties of the user, apply them on assets, and check whether access could be granted by matching the user defined permissions with the permissions defined on the assets.

These traditional solutions try to solve the authentication and authorization problems for simple and perhaps the most common requirements in a single application.

However, the above (and other) techniques may have one or more disadvantages in providing application security:

1) In certain instances, XML configuration and static ACL tables in an RDBMS maybe somewhat less flexible and may not be extensible. The permissions may be more static or fixed and not as flexible to define. Even though a user may configure the checking policies of an authorization flow, extension of the authorization flow may be impossible.

2) In certain instances, the credentials may include principals (users) and roles. This role-based approach may be too restrictive on the authorization process and may not support some common use cases. Further, the property file may be static and not able to be extended by other component at runtime to provide extensible authorization extensions.

3) In certain instances, the permission may be static checks that only define whether the permission matches or does not. Further, there may be no extensible, interpreted rules that may be contributed from other components/applications/systems.

Thus, it will be appreciated that there is a need in the art for improved techniques of providing security to applications in, for example, a business or technical process environment in which multiple processes and/or applications communicate with one another. Certain example embodiments may provide functionality for registering extensions to authorization checks and/or may provide distributed authorization checks for security in a non-application specific way and in conjunction with application-specific security.

In certain example embodiments, an authorization system is provided that allows for flexibility of how authorization for a given resource takes place. In certain example embodiments, the authorization system provides extension points that allow abstraction with respect to the component that implements the authorization rules for an implemented component. Accordingly, certain example embodiments may be unobtrusive and may provide for implementation of the authorization component on the component that extends a given extension point.

Certain example embodiments may delegate authorization requests to extending components in order to fulfill such authorization request. This may include forwarding the current security context to the extending component. Certain example embodiments may register responsible components in a registry (or other similar implementation) to provide a way to find and/or delegate authorization requests. Certain example embodiments may provide hooks for extensibility, which may be used by the extending component so that application-specific (e.g., localized) process or data authorization requests may be realized.

In certain example embodiments, a computer implemented method is provided for distributed authorization. The method is provided on a processing system that includes at least one processor and a memory for executing plural software applications. A security context is created for a client of a first application. In the first application, a connection is accepted from a client of the first application. The client is authenticated and a request from the client to access at least one resource in the first application is accepted. The first application communicates with the second application to determine whether the authenticated client is authorized to access the at least one resource. In the second application, an authorization process is executed on the processing system based on the communication from the first application and the security context. For at least one step in the authorization process, the second application communicates with another application to determine whether the client is authorized to access the at least one resource. Based on this determination, the first application allows or does not allow access.

In certain example embodiments, an authorization system for granting access to a resource of a computing application is provided. The system includes a storage medium that is configured to store a three part permission structure that is associated with the resource. The three part permission structure includes: (1) a first part that includes a domain or type of the resource; (2) a second part that defines at least one action that is done on the resource; and (3) a third part that includes a regular expression that, upon evaluation, produces output including an indication of the resource. The system includes a processing system configured to evaluate an authorization request to the resource based on the three part permission structure.

In certain example embodiments, a computer implemented method of evaluating an authorization request in an authorization application is provided. The authorization request is made from a first computing application. The authorization request is received from the first computing application. A security context is created based on the authorization request. The security context includes information on: a requesting client; a resource associated with the request, and at least one permission associated with the resource. At least one rule is retrieved that is associated with a callback function that calls an authentication process that is defined in a second computing application. An abstract syntax tree is built based on the security context and the at least one rule. The abstract syntax tree is evaluated. A callback is performed to the authentication process defined in the second computing application during the evaluation of the abstract syntax tree. A result of the authorization request is returned based on the evaluation of the abstract syntax tree to the first computing application.

Non-transitory computer readable storage mediums tangibly storing instructions for performing the above-summarized and/or other methods also are provided by certain example embodiments, as well as corresponding computer programs.

Systems and/or computer based apparatus may also be configured or adapted to implement the above-summarized and/or other methods provided in certain example embodiments.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments provide flexibility for authorization logic that is used by an application. In particular, certain example embodiments provide extension points, which are easy, abstract, and powerful for the component that extends the functionality provided by the base implementation. These extension points may also be open and/or independent of who implements the rules for authorization. Accordingly, in certain instances, that implementation may be unobtrusive and may allow substantial (or sometimes even complete) implementation of the authorization logic on the extending component side. Thus, certain example embodiments may provide a distributed, extensible authorization scheme on a computing system.

Figure 1:
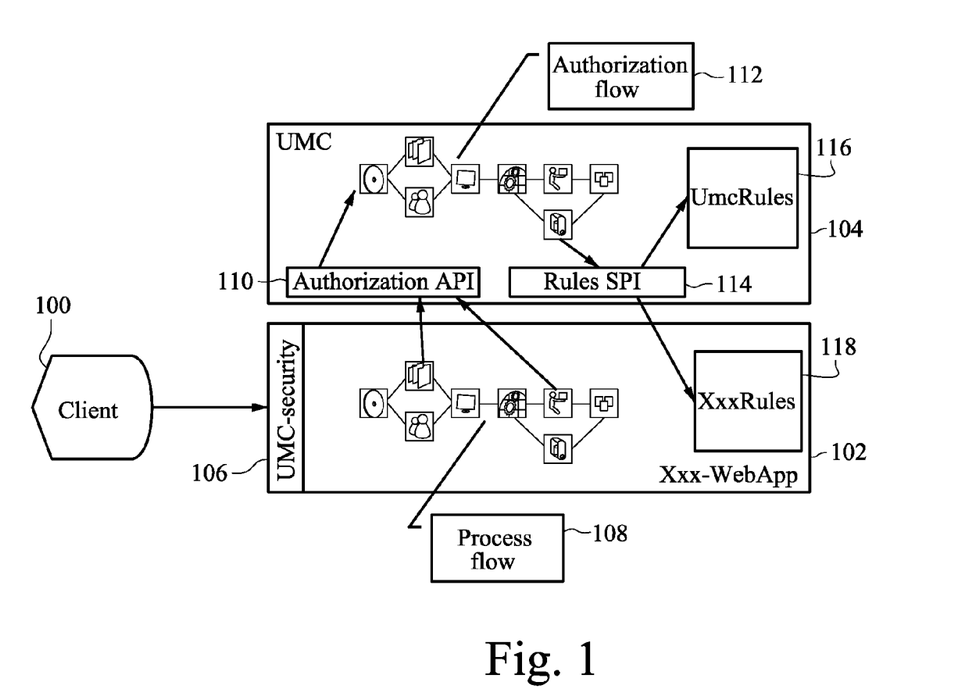
FIG. 1 is an example of an application that integrates authorization with a user management control according to certain example embodiments.

FIG. 1 is an example of an application that integrates authorization with a user management control according to certain example embodiments. In this example, a client 100 requests authentication to web application 102. Authentication for the web application 102 may be provided by a user management central (UMC) system/component 104 (which may be an application, an API, a framework, or other type of component that an extending application) through a security implementation 106. Once authenticated, the client may interact with the process flow 108. After authentication, a security context for the authenticated user may be built or loaded. This may include information on the user/client, tenant, associated roles and/or permissions, etc. In certain example embodiments, such security context information may be provided in the UMC framework 104, the web application 102, or some combination thereof (e.g., user information is stored in the UMC while application-specific information stores, through an extension, permission information).

The client 100 may continue to interact with the process flow 108 inside the web application 102 in order to fulfill some particular client request. In certain instances, some particular business logic may require some form of authorization (e.g., a feature or asset) before the process may continue. In such cases, the authorization API 110 in the UMC 104 may be used to determine whether or not the loaded security context is authorized for a given resource (e.g., features, process subset, data, etc.).

When authorization is requested, the authorization process flow 112 is executed to determine whether or not the requesting entity is allowed to access a given resource. The process flow 112 may use stored permissions, the security context, and/or rules run through the rules Service Provider Interface (SPI) 114. In certain instances, the SPI may be used to extend and/or implement classes/interfaces/methods/etc to achieve a goal.

The rules for the rules SPI 114 may be taken from the UMCRules 116 database and/or the rules database 118 in the web application 102. Rules defined in the hosting application (e.g., web application 102) may facilitate of provision of application-specific business logic for authorization. In this case the UMC 104 may call this rule extension during the authorization flow 112 as a callback that is enhanced with the security context. The result of this context may be the outcome for the authorization determination.

Accordingly, hosting applications (e.g., web application 102) may use the authorization API 110 of an example UMC 104, but may also provide extensions for how the authorizations are determined based on the needs of the given application. Such scenarios may also work in a distributed application environment.

Figure 2:
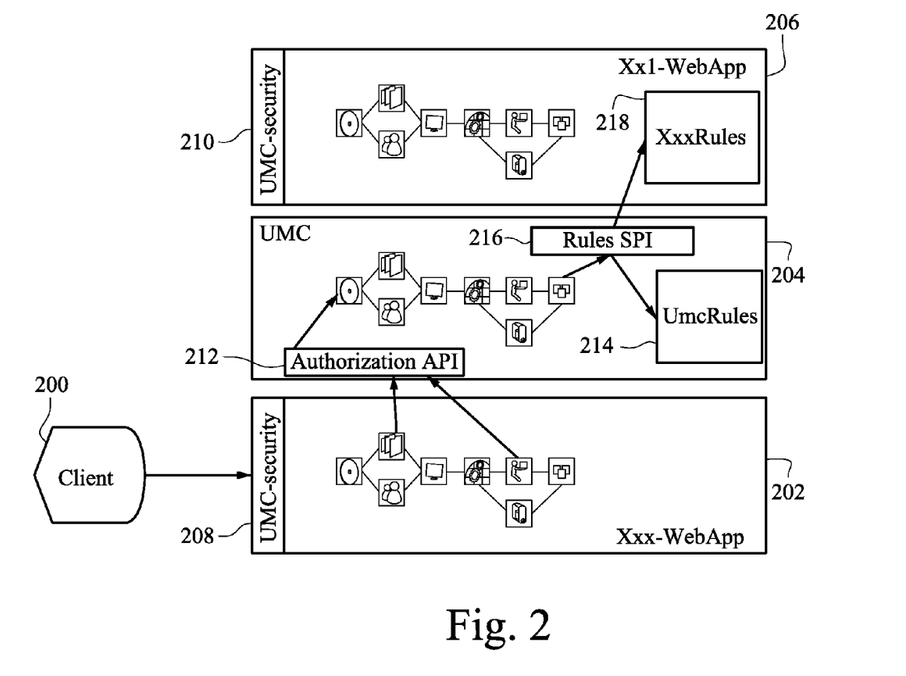
FIG. 2 is an example of distributed authorization for an application.

FIG. 2 is an example of distributed authorization for an application. Here, a client 200 requests authentication to web application 202 via a security layer 208. At some point during client 200's access to the application 202, an authorization check may be required. At this point the application 202 may interface with the authorization API 212 of UMC 204. As explained above, the UMC may implement a process for determining if the requesting client (or their security context) is authorized for a given resource. Part of this process may include interfacing with the rules SPI 216 and the umcRules database 214. In this example, the authorization rule(s) for application 202 may be set forth in application 206. Application 206 may include a registered extension that may get called as part of the UMC processing even though application 202 does not "know" about application 206. Accordingly, callback functionality is implemented such that when a rule associated with application 202 is run, UMC 204 may determine that an extension is registered with the associated rule.

Based on the association, the Rules SPI may interact with application 206 and the rules database 218 defined therein to resolve the authorization request from application 202.

Accordingly, in certain example embodiments, when the application 206 disappears or is offline, all client requests that involve rules defined in application 206 may be defined. In certain example embodiments, such features may provide another safety net such that when no component is found that could grant the access, that access is denied.

Figure 3:
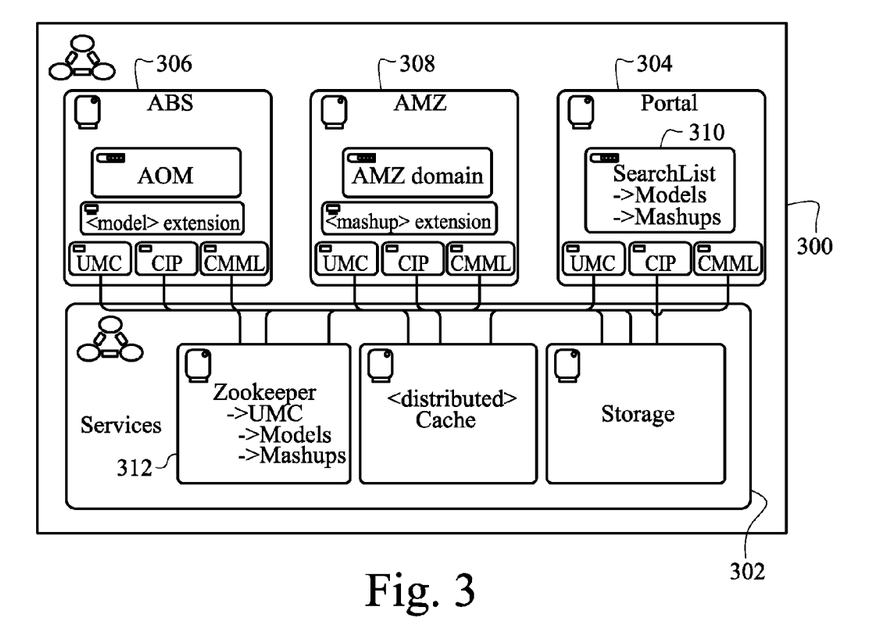
FIG. 3 is an example implementation of a distributed authorization system according to certain example embodiments.

FIG. 3 is an example implementation of a distributed authorization system according to certain example embodiments. In this example, an application 302 may include a "SearchList" component 310 that is accessible through a portal 304. The application 302 may also include an AMZ component 308 and an ABS component. In certain instances, the AMZ component may be a product available from the assignee of the instant application, for example, ARIS MashZone. In certain instances, the ABS may be in the form of a product provided by the assignee of the instant application, for example, ARIS Business Server. Each of the components may implement UMC functionality and may also interact with various services, such as the zookeeper component 312 that includes the UMC.

The search list component 310 may provide data about models and mashups. These may be secured assets that may not be accessible to every user or client. Accordingly, an authorization scheme may be implemented to control access to these resources. In certain example embodiments, the portal 304 may not know how to grant access to these resources. Further, as determination of access to the resources may require business logic, the backend UMC may also not be able to provide a determination (e.g., because it is business logic agnostic). Thus, in certain instances, the UMC may "find" the <model> and <mashup> extensions and delegate the authorization checks to these extensions (e.g., as implemented in the ABS and AMZ components 306 and 308). The results of these extensions may determine whether or not the assets are shown to a client/user.

Permissions

The determination as to whether a client is authorized to access a given resource may include specification of permissions. In certain example embodiments, a permission object may include three parts that are delineated by colons. For example, <part1>:<part2>:<part3>.

With such an implementation, the parts may describe the permission so that general aspects as well as more specific ones may be described in a non redundant and combinable way.

In certain example embodiments,

<part1> describes the domain in which the permission is applied or the type of asset to which it is applied.

<part2> describes the action(s) which are done in the domain or the asset type.

<part3> describes the ID of the asset and/or a regular expression that may be evaluated to filter types.

In certain example embodiments, one or more of the following symbols may be used:

1) Symbols allowed (inside parts):
   a) * (e.g., all domains/types, actions, IDs)
   b) —(e.g., none). In certain example embodiments, part 3 of a permission may be left empty.

c) Comma separated lists (e.g., for actions to define more than one without repeating permission definitions)
d) Regular expression (regular expressions may be defined by the "/" symbol, for example "/<regex>/", where regex is the regular expression implemented by a user)

2) Forms not allowed: <part1>::<part3>
3) Optional Parts: <part2>, <part3>

TABLE 1

| Permission # | <Part 1> Domain/Type | <Part2> Action | <Part 3> ID/RegEx |
|---|---|---|---|
| 1 | Process | manage | |
| 2 | Process | manage, exec | |
| 3 | Mashup | read, write | ID01, ID02 |
| 4 | Report | * | GUID1, GUID2, etc |
| 5 | Document | write | — |
| 6 | Document | read | /T123-\\d*/ |
| 7 | Explorer | read, write | GUID12345 |

As shown above in Table 1, various permissions may be defined. Such permissions may be used in association with certain example embodiments. Permissions 1 and 2 show where either one or two actions are allowed in the domain of process (e.g., manage or exec). In certain example embodiments, by leaving "part 3" blank, the system may automatically fill in a blank part 3 with * that means "all."

Permission number 3 includes multiple actions with a list of IDs. The fourth permission is set up to allow all actions on a list of IDs. The fifth permission shows an example of the "–" symbol. Specifically, usage of the minus symbol states that all write action in the domain "document" are allowed as long as no ID is specified. Such a permission may be used, for example, in scenarios where document creation is allowed for everyone but the updating of an existing document specified by an ID. Such an example may be used for ownership protection scenarios.

The sixth permission shows an example of a regular expression that filters the list of IDs so that only IDs that are prefixed with T123—are selected and granted. The seventh permission may be used for extending the authorization logic. Given the assumption that "GUID12345" is the ID for the root node in a tree, an extension module may then check whether a certain folder that has to be granted is a subfolder of this node in order to grant access. Such scenarios may be used for permission inheritance where the permission is placed with the parent asset and an extension is used to determine whether or not to grant access to a child.

Authorization Flow

In certain example embodiments, an authorization flow is provided as a generic process. This process may then interpret the optionally extended abstract rules syntax tree for a given security context. The generic process may have no notion of implemented extensions and may be agnostic as to how many there are and where the extension reside. Thus, the process may be flexible without the need to know where every special implementation resides. In certain example embodiments, only the registry is asked at runtime in order to provide registered callbacks. Any number of callbacks may be implemented and may be subsequently provided on any host.

Figure 4:
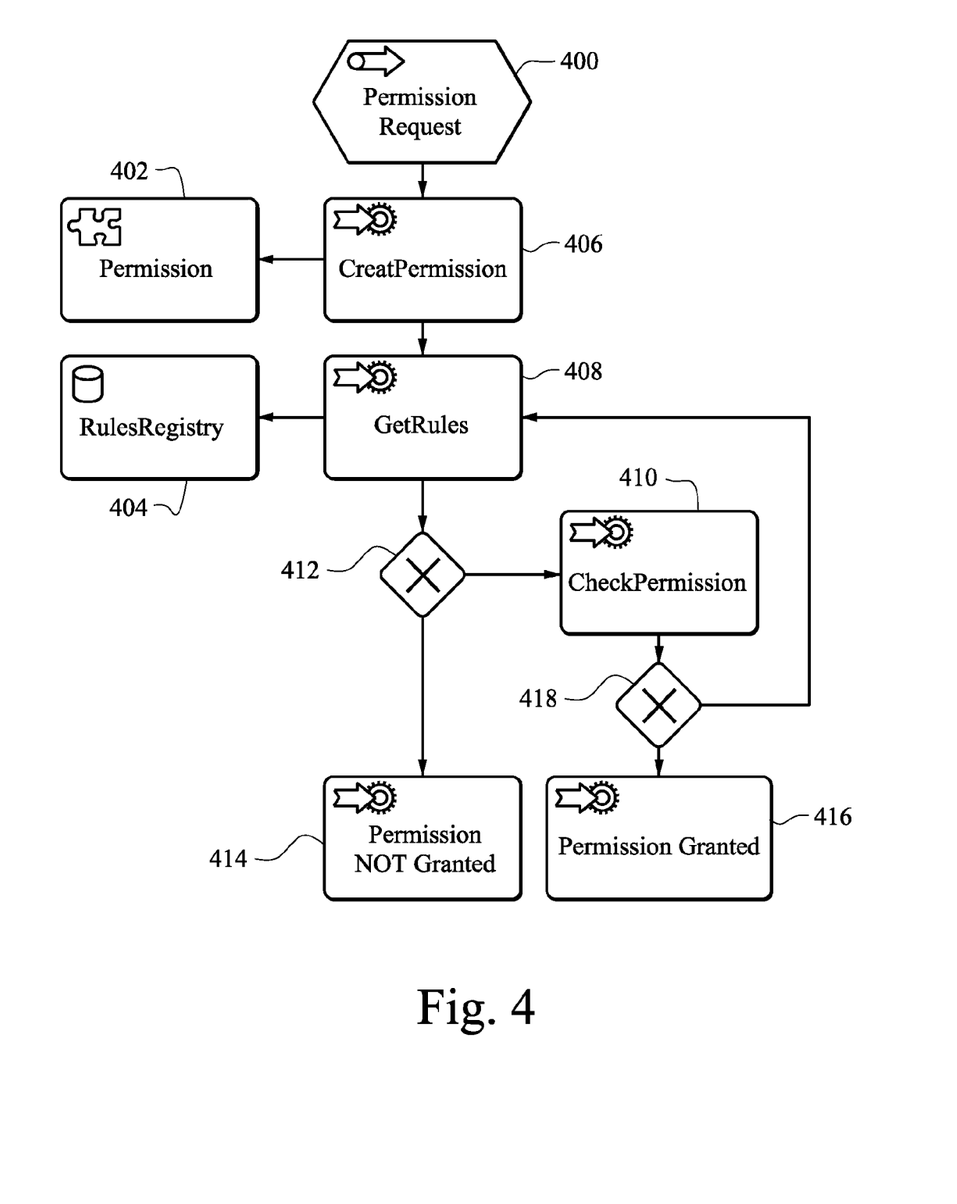
FIG. 4 is a flowchart of an example process for evaluating authorization requests according to certain example embodiments.

FIG. 4 is a flowchart of an example process for evaluating authorization requests according to certain example embodiments. The process shown in FIG. 4 may include 3 broad tasks, namely: (1) create the security context; (2) interpret an authorization request; and (3) return the (or deliver) the result of the interpretation. In FIG. 4, an initial permission request is made when a user requests a resource at 400. The permission for the given resource is "created" or loaded at 406 from the permission store 402. Similarly, the rules for the loaded permission, the resource, and/or the requesting user are loaded in 408 from the rules registry 404. As explained above, in certain example embodiments, the rules may be provided from a centrally managed store (e.g., UMC) or may be provided in application-specific logic. The logic may be stored in the requesting application or another application that is separate from the requesting application (e.g., as shown in FIG. 2).

Once the user, the permissions, and the rules are loaded, the security context for this authorization may be complete. With the completed security context, the authorization check may be performed by proceeding from 412 to the check permission step 410. As noted above, in certain cases, other applications may provide authorization processing for an application. In such cases, if the other application that is set to provide the authorization logic is not available the process may proceed to 414 where authorization is denied for the given resource.

If, however, the application is available, the permission in question for the resource is checked at 410. If the check was successful at 418, then permission is granted in step 416. If the permission was not successful, the process may circle around to see if permission is granted via another rule.

In certain example embodiments, the process of granting authorization such that if there is an express ban (e.g., do not allow user X to access resource T) then the processing may stop and proceed to 414.

Security and Logging

In certain example embodiments, preventing outside attacks on hosted components may be desirable. In such cases, the application interfaces may send requests to/from authorization demands/requests through locally deployed interfaces reachable only within a running JVM or through HTTPS to remote clients. Furthermore, in certain example embodiments, requests to hosted components may be filtered through a security filter according to a servlet specification that is responsible for proper authentication. If the provided credentials are not sufficient such a request may be denied, filtered out, and sent back to the client with appropriate error messages and HTTP status code. However, if the security filter is passed successfully, an authorization request may be made.

In certain example embodiments, an authorization process may provide error messages with corresponding HTTP response codes if an authorization request is not granted. These failing authorization requests may be logged out with a default log level of warning so that an administrator or other user may easily monitor such requests. In certain instances, granted authorization request may be logged out with a lower log level (e.g., debug). In certain example embodiments, such an event log may be turned off for a production environment.

Flexibility

In certain example embodiments, an authorization system may have features that improve the flexibility of how the system is used, designed, developed, called, extended, and the like.

For example, permission requests may include permissions such as "domain/action/*." Alternatively, or in addition, permissions may have more complex permissions such as, for example, "domain/action, action/<regex>." These "complex" permissions can facilitate the usage of a range of possibilities as to how an authorization request may be handled.

In certain example embodiments, the extension and/or plug-in capability can facilitate flexibility for system designers in how to implement authorization logic at the points where the needs for protection on a given resource in a given context may be more specifically fulfilled (or defined).

In certain example embodiments, an authorization implementation could be used and deployed in a wide range of architectures. Such architectures may range from a local JVM scenario inside one application, to a cluster of applications spread over more than one JVM, or even up to complete cloud scenarios in which applications are started and shut down on demand.

Example Implementation

An example implementation may include one or more of the following features that facilitate a non-intrusive application, flexibility, and showing some kind of migration path to adopt existing applications with the techniques described herein.

An implementation may include a UMC (User Management Central) component inside an ARIS server that manages all of the permissions by default.

Applications may then have a choice as to how authorization is handled for the application. In one scenario, the application may manage all of the authorization and only using the authentication context provided by the UMC. In another implementation, the application may use the UMC as a generic authorization provider, but with extra extensions in the form of custom rules (that may be related to this and/or other applications). This may be considered a hybrid approach. Yet another approach may be that the application uses only UMC provided functionality for administration, storage of rules, etc.

In certain example embodiments, there may be little or no difference as to whether permissions are related to a feature or an asset (e.g., as asset permissions may be a more specific form of a feature permission).

A central user interface may be hosted by the UMC and in certain example embodiments may be a web-based interface. In certain example embodiments, the storage of permission may be done in the UMC, and then an application that extends such functionality may store permissions of a user through this interface in the UMC and interpret it during runtime.

Application Programming Interface

In certain example embodiments, an application programming interface to an example UMC may be provided in order to facilitate external application interaction with the UMC provided functionality.

In certain example embodiments, when using authorization at runtime there may be a declarative API that uses annotations. Such declarations may facilitate delegation of an authorization request to UMC. In certain example embodiments, the delegation may be done programmatically. This example technique may provide a higher level of control (but at the possible expensive of being more intrusive on the users interacting with the UMC. Thus, in a preferred embodiment, a declarative annotation may be used with the option for also using the programmatic technique.

A declarative implementation may have the following or similar structure (e.g., Declarative per @Annotation):
@is InRole(String role)
@is Permitted(String permission)

A programmatic implementation may be made using the following or similar example interface:

```
interface authorization
{
    boolean hasRole(User user, String role);
    boolean hasRole(User user, Role role);
    boolean hasPermission(User user, String permission);
    boolean hasPermission(User user, Permission permission);
}
```

In certain example embodiments, the UMC API may provide CRUD operations (Create, Read, Update, Delete) on permissions for storage and the like.

Certain example embodiments may also provide for the ability to build up an abstract syntax tree (AST) that includes the rules defined in an extension in a fluid way that leads to a DSL built upon the well known builder pattern.

Figure 7:
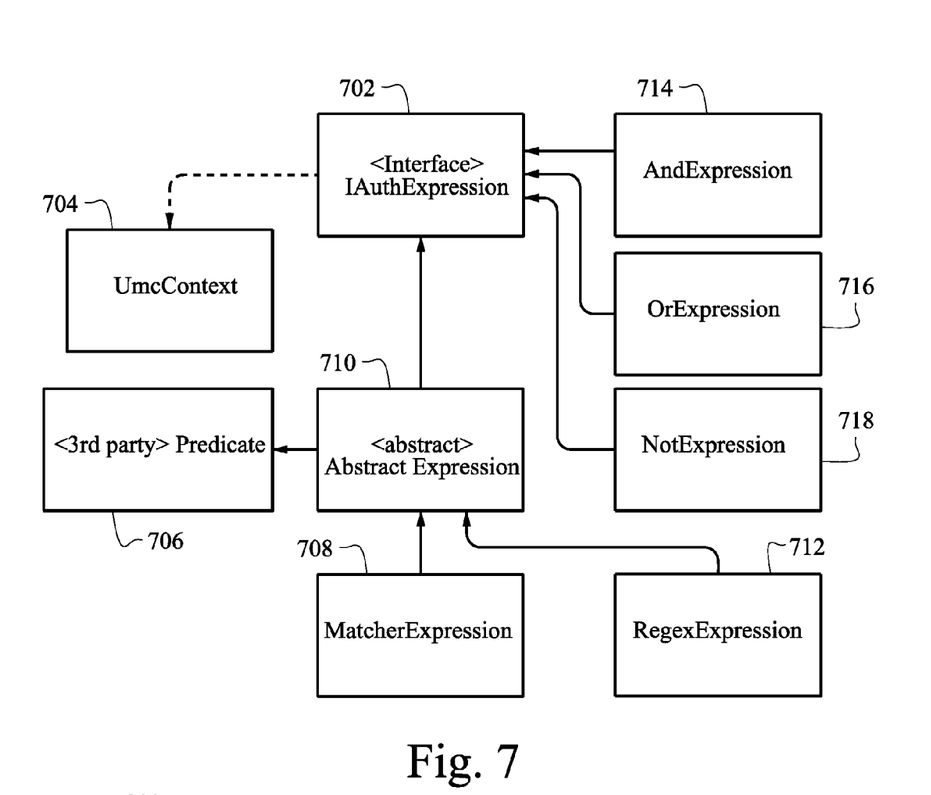
FIG. 7 is an illustration of an example class diagram used in defining authorizations according to certain example embodiments.

In certain example embodiments, an AST may be built upon one or more components. For example, the components shown in FIG. 7 (discussed below) may be used to construct an AST. Such a tree structure may have the following format, <MATCH><perm1><OR><NOT><REGEX><perm1> . . . . Or may be similar to the following permission check logic,
  IF (perm1 matches exactly) OR NOT(perm1 matches <RegEx>)
  THEN grant
  ELSE not grant While "match" and "regex" expressions are shown in FIG. 7, other types of extensions may be included in the AST to, for example, facilitate authorization checks. In certain example embodiments, a builder pattern may allow for a DSL (Domain Specific Language) building of the tree. An example is
Authorization.match(Perm1).or(  ).not(  ).regex(Perm1).check( ).

Such an expression of the above noted tree may be used to facilitate a "fluent" style for building of the tree.

Figure 5:
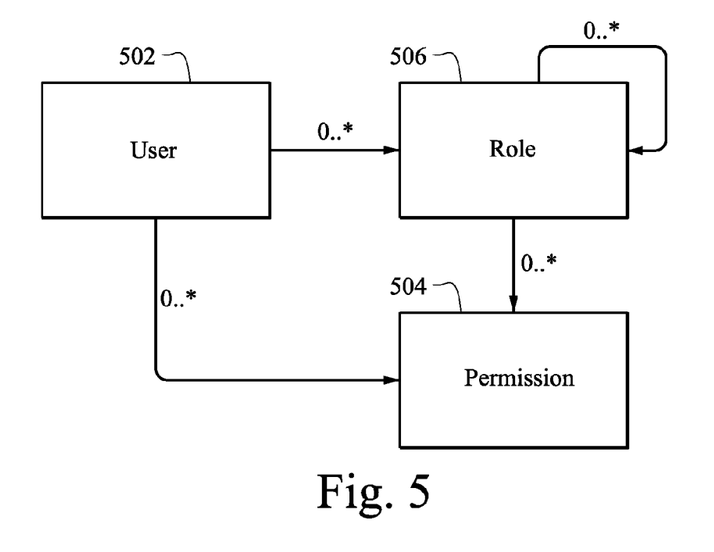
FIG. 5 is an illustration of an extended domain model.

FIG. 5 is an illustration of an extended domain model. In certain example embodiments, a permission entity may be provided. Such a permission entity 504 may be relatable to both users 502 and role 506. These relationships may be 0 to many (e.g., a given user may have 0 or many permissions associated with it). Roles with one or more permissions assigned may be so-called user groups that are used to grant users whole permission sets by assigning this role/user group to the user.

Figure 6:
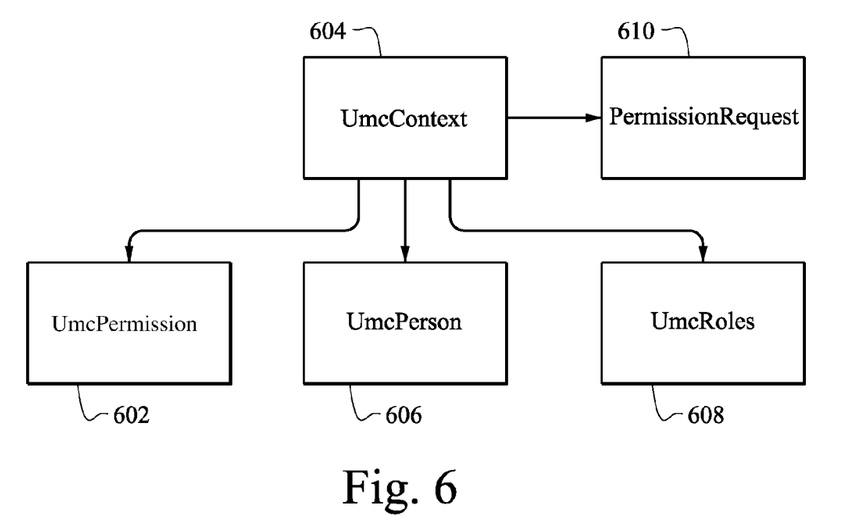
FIG. 6 is an illustration of a security context.

FIG. 6 is an illustration of a security context. In certain example embodiments, a UMC provides a security context either to the UMC or an extension to the UMC. In this respect, a umcContext 604 is provided that includes the user 606 who requested the feature or asset, the tenant the user belongs to, all roles 608 the user is assigned to, and any role dependent permissions 602. In certain example embodiments, the tenant property may be an object. In certain example embodiments, the tenant property may be an attribute of the user. The context 604 may then be used for a permission request 610. In certain example embodiments, the data may be loaded via an "eager" technique or a "lazy" technique (e.g., based on performance, memory considerations, etc.).

Grammar

In certain example embodiments, the rules are defined as interfaces that are used to build up an abstract syntax tree (AST) that is used to determine whether or not permissions are granted.

Thus, FIG. 7 is an illustration of an example class diagram used in defining authorizations according to certain example embodiments. UmcContext 704, Matcher Expression 708, and RegexExpression 712 may be functionalities that are provided from a UMC implementation. Also, third part predicate 706 may be an extension point that is implemented for authorization defined within a hosting component. Interface 702 may have functionality that implements the interface such as, for example, AndExpression 714, OrExpression 716, and/or NotExpression 718. Other types of expression may also be implemented, for example an XOR expression. Abstract class 710 may have various expressions that are implemented. In this example, matcher 708 and regex expressions may be implemented. However, again, additional expressions may be implemented depending on a given implementation.

For a given grammar, the AST may be built at runtime based on the default rules found in the UMC and any extension rules defined in a hosting application. Based on the built AST, a given permission may be evaluated to determine if an authorization request is to be granted or not. For example, if no rule grants the permission the outcome may be returned as "false" (e.g., authorization is denied).

Optional rules that have been extended are predicates and may be registered as a callback. Thus, these may be called back at runtime with the correct security context (see above). As the basic building blocks are a mix of a decision table applied in an extensible interpreter pattern, the ASTs are powerful and facilitate the provision of expressions for component-specific authorization needs.

Figure 8:
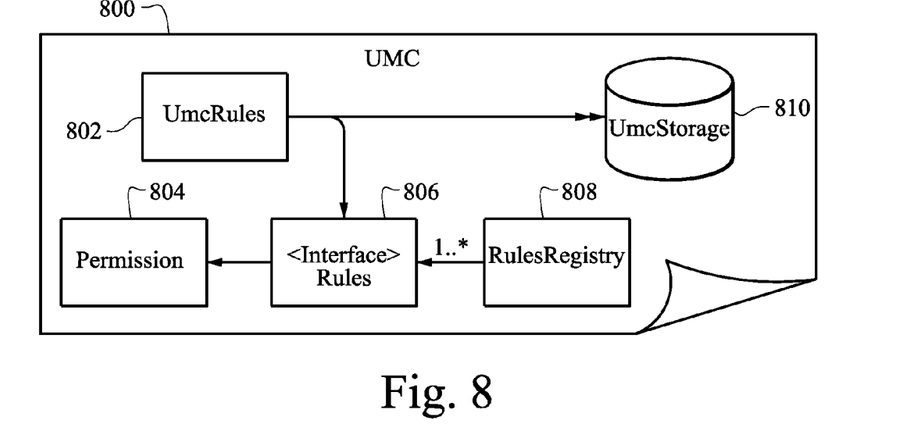
FIG. 8 is an illustration of an implementation for storing permissions according to certain example embodiments.

FIG. 8 is an illustration of an implementation for storing permissions according to certain example embodiments. UMC 800 includes umc defined rules 802 that are stored in a database 210 in the UMC. Umc based storage of permissions 804 is through a schema of the UMC inside the component and accessed through general API. Thus, a central repository of rules may be created if one wants to apply permissions to users or roles.

Rules may also be extensible via the rules interface 806. Applications that implement their own rules may register with the rules registry 808 in the UMC 800.

Figure 9:
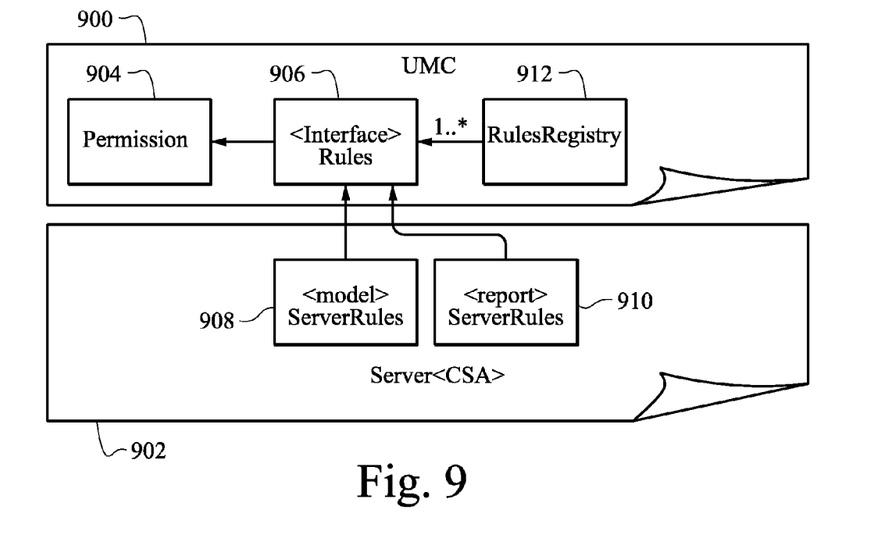
FIG. 9 is an illustration of an extension to an authorization framework according to certain example embodiments.

FIG. 9 is an illustration of an extension to an authorization framework according to certain example embodiments. UMC 900 may be similar to UMC 800 shown in FIG. 8 (as with 904, 906 and 912). Here, <model> 908 and <report> 910 implement the rules interface 906 in server 902. In certain example embodiments, these plug-ins can be registered inside a hosting component inside one JVM without being seen from the outside because the API provided to register is locally published and not reachable from a remote protocol. Alternatively, the API may be made available to external resource (e.g., over a network).

Figure 10:
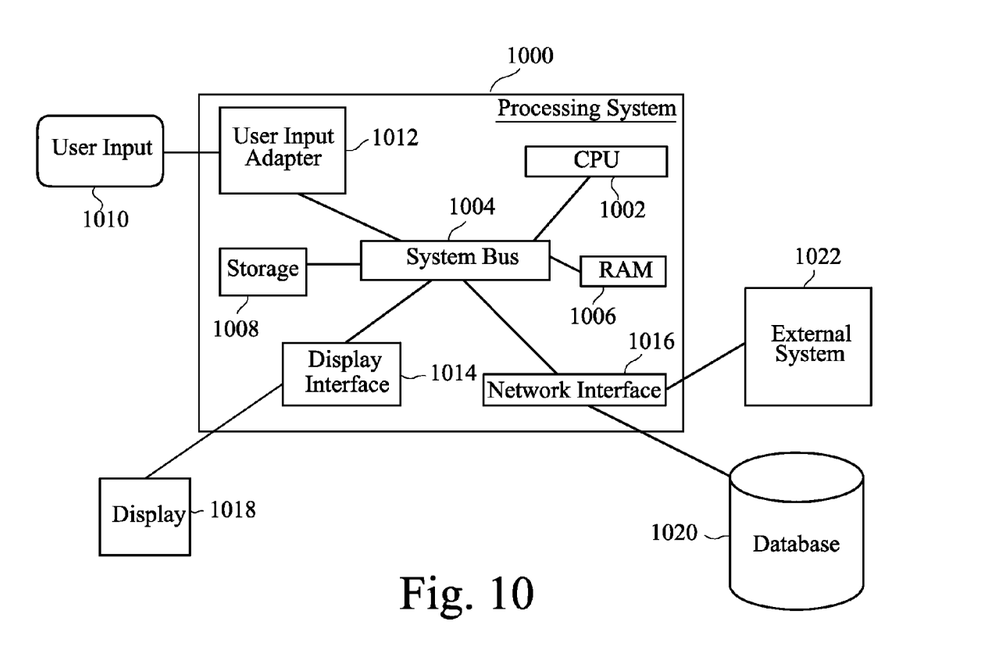
FIG. 10 shows an example processing system according to certain example embodiments.

FIG. 10 shows an example processing system according to certain example embodiments. Processing system 1000 may include a central processing unit 1002 that is communicated over a system bus 1004 with a storage medium 1008 that may be non-volatile storage. Random Access Memory (RAM) 1006 (e.g., volatile storage) may be accessible over the system bus 1004. A user input device 1010 such as, for example, a key board, touch pad, mouse, etc. may be provided and communicate with a user input adapter 1012. A display 1018 may be provided to facilitate user interaction with processes that are performed on the processing system 1000. The display 1018 may interact with the processing system through a display interface 1014. The display 1018 may relate the development of authorization process, and their implementation by users. A network interface 1016 may be provided that communicates with a database 1020 and/or an external system 1022. The database 1020 may hold rule information for a UMC or other extensions of the UMC. External systems may include web services or other systems that the processing system 1000 may interact with (e.g., application 206 in FIG. 2).

Certain example embodiments may relate to providing security for Business Process Models It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method of providing distributed authorization in a processing system including at least one processor and a memory for executing plural software applications, the method comprising:
  creating a security context for a client of a first application executable in the processing system;
  in the first application:
    accepting a connection from the client to the first application;
    authenticating the client to the first application;
    accepting a request from the client to access at least one resource of the first application executable in the processing system;
    in response to the request, communicating with a second application to determine whether the authenticated client is authorized to access the at least one resource;
  in the second application:
    executing, via the at least one processor of the processing system, an authorization process based on the communication from the first application and the created security context; and
    for at least one step within the authorization process, communicating with a third application, in order to determine whether the client is allowed to access the at least one resource by referencing one or more extensions registered with the third application that extend privileges for the first application to the client,
  the method further comprising:
  retrieving at least one rule that is associated with a callback function that calls an authentication process that is defined in the second application;
  building an abstract syntax tree based on the security context and the at least one rule;
  evaluating the abstract syntax tree;
  performing a callback to the authentication process defined in the second application during the evaluation of the abstract syntax tree; and returning a result of the authorization request based on the evaluation of the abstract syntax tree to the first application,
wherein the first application allows access to the at least one resource based on a result of the authorization process executed within the second application.

2. The method of claim 1, wherein the first application is not directly linked to, and does not directly communicate with, the third application.

3. The method of claim 2, wherein the third application is directly linked to, and communicates directly with, only the second application.

4. The method of claim 3, wherein the second application is programmed to receive a plurality of authorization requests for resources within the processing system from a plurality of different software applications.

5. A non-transitory computer readable storage medium tangibly storing instructions that, when executed by a processor of a computer, perform the method according to claim 1.

6. An authorization system for granting access to a resource of a computing application, the system comprising:
a storage medium that is configured to store a three part permission structure that is associated with the resource, the three part permission structure including:
a first part that includes a domain or type of the resource,
a second part that defines at least one action that is done on the resource, and
a third part that includes a regular expression that, upon evaluation, produces output including an indication of the resource; and
a processing system that includes at least one processor, the processing system configured to:
evaluate an authorization request to the resource, from a first application, based on the three part permission structure, the evaluation referencing one or more extensions registered with a second application that extend privileges for the first application,
retrieve at least one rule that is associated with a callback function that calls an authentication process that is defined in the second application,
build an abstract syntax tree based on the security context and the at least one rule,
evaluate the abstract syntax tree,
perform a callback to the authentication process defined in the second application during the evaluation of the abstract syntax tree, and
return a result of the authorization request based on the evaluation of the abstract syntax tree to the first application.

7. The system of claim 6, wherein the third part includes an identifier of another, second resource.

8. The system of claim 6, wherein the first, second, and/or third part(s) of the three part permission structure includes an identifier that allows for any matches associated with the respective part that includes the identifier.

9. The system of claim 6, wherein the third part of the three part permission structure includes an identifier that indicates no resource identifiers are allowed.

10. A computer implemented method of evaluating an authorization request in an authorization application on a processing system including at least one processor and a memory, where the authorization request is made from a first computing application, the method comprising:
receiving the authorization request from the first computing application;
creating a security context based on the authorization request, the security context including information on: a requesting client; a resource associated with the request, and at least one permission associated with the resource;
retrieving at least one rule that is associated with a callback function that calls an authentication process that is defined in a second computing application;
building an abstract syntax tree based on the security context and the at least one rule;
evaluating the abstract syntax tree;
performing a callback to the authentication process defined in the second computing application during the evaluation of the abstract syntax tree;
returning a result of the authorization request based on the evaluation of the abstract syntax tree to the first computing application.

11. The method of claim 10, wherein the second computing application and the first computing application are the same application.

12. The method of claim 10, wherein the second computing application is different from the first computing application.

13. The method of claim 12, wherein the first computing application is not directly linked to, and does not directly communicate with, the second computing application.

14. The method of claim 13, wherein the second computing application is directly linked to, and communicates directly with, only the authorization application.

15. The method of claim 14, further comprising receiving a plurality of authorization requests related to resources within the processing system from a plurality of different software applications.

16. The method of claim 10, wherein the at least one permission associated with the resource is defined in a three-part permission structure that comprises:
a first part that includes a domain or type of the resource,
a second part that defines at least one action that the requesting client is to perform on the resource, and
a third part that includes a regular expression that, upon evaluation, produces output including an indication of the resource.

17. The method of claim 16, wherein the third part includes an identifier of another, second resource.

18. The method of claim 17, wherein the first, second, and/or third part of the three part permission structure includes an identifier that allows for any matches associated with the respective part that includes the identifier.

19. The method of claim 18, wherein the third part of the three part permission structure includes an identifier that indicates no resource identifiers are allowed.

20. A non-transitory computer readable storage medium tangibly storing instructions that, when executed by a processor of a computer, perform the method according to claim 10.

21. A computer-implemented method of providing distributed authorization in a processing system including at least one processor and a memory, the method comprising:
receiving a communication from a first application, wherein the communication from the first application comprises a security context for a client, wherein the security context comprises information on the client, at least one resource of the first application, and at least one permission associated with the at least one resource;

retrieving at least one rule that is associated with a callback function that calls an authentication process that is defined in a second application;

building an abstract syntax tree based on the security context and the at least one rule;

evaluating the abstract syntax tree;

performing a callback to the authentication process defined in the second application during the evaluation of the abstract syntax tree;

returning a result of the authorization request based on the evaluation of the abstract syntax tree to the first application; and executing an authorization process based on the communication from the first application and the security context in order to determine whether the client is allowed to access the at least one resource of the first application by referencing one or more extensions registered with a third application that extend privileges for the first application to the client.

22. The method of claim 21, wherein the first application is not directly linked to, and does not directly communicate with, the third application.

23. The method of claim 21, wherein the third application is directly linked to, and communicates directly with, only the second application.

24. The method of claim 21, wherein the second application is programmed to receive a plurality of authorization requests for resources within a processing system from a plurality of different software applications.

25. The method of claim 21, wherein the security context is a three part permission structure that is associated with the at least one resource, the three part permission structure comprising:

a first part that includes a domain or type of the resource, a second part that defines at least one action that is done on the resource, and a third part that includes a regular expression that, upon evaluation, produces output including an indication of the resource.

26. The method of claim 25, wherein the third part includes an identifier of another, second resource.

27. The method of claim 25, wherein the first, second, and/or third part(s) of the three part permission structure includes an identifier that allows for any matches associated with the respective part that includes the identifier.

28. The method of claim 25, wherein the third part of the three part permission structure includes an identifier that indicates no resource identifiers are allowed.

29. A computer-implemented method of providing distributed authorization in a processing system including at least one processor and a memory, the method comprising:

accepting a connection from a client to the first application;

authenticating the client to the first application;

accepting a request from the client to access at least one resource of the first application;

in response to the request, communicating with a second application to determine whether the authenticated client is authorized to access the at least one resource by referencing one or more extensions registered with a third application that extend privileges for the first application to the client;

retrieving at least one rule that is associated with a callback function that calls an authentication process that is defined in the second application;

building an abstract syntax tree based on the security context and the at least one rule;

evaluating the abstract syntax tree;

performing a callback to the authentication process defined in the second application during the evaluation of the abstract syntax tree; and returning a result of the authorization request based on the evaluation of the abstract syntax tree to the first computing application, wherein the communication with the second application comprises a security context for the client, wherein the security context comprises information on the client, the at least one resource associated with the request, and at least one permission associated with the at least one resource.

30. A system for providing distributed authorization, comprising:

a processing system having at least one memory and at least one processor, the processing system configured to:

receive a communication from a first application, wherein the communication from the first application comprises a security context for a client, wherein the security context comprises information on the client, at least one resource of the first application, and at least one permission associated with the at least one resource;

retrieve at least one rule that is associated with a callback function that calls an authentication process that is defined in a second application;

build an abstract syntax tree based on the security context and the at least one rule;

evaluate the abstract syntax tree;

perform a callback to the authentication process defined in the second application during the evaluation of the abstract syntax tree;

return a result of the authorization request based on the evaluation of the abstract syntax tree to the first application; and execute an authorization process based on the communication from the first application and the security context in order to determine whether the client is allowed to access the at least one resource of the first application by referencing one or more extensions registered with a third application that extend privileges for the first application to the client.

31. A system for providing distributed authorization, comprising:

a processing system having at least one memory and at least one processor, the processing system configured to:

accept a connection from a client to the first application;

authenticate the client to the first application;

accept a request from the client to access at least one resource of the first application;

in response to the request, communicate with a second application to determine whether the authenticated client is authorized to access the at least one resource by referencing one or more extensions registered with a third application that extend privileges for the first application to the client;

retrieve at least one rule that is associated with a callback function that calls an authentication process that is defined in the second application;

build an abstract syntax tree based on the security context and the at least one rule, evaluate the abstract syntax tree;
perform a callback to the authentication process defined in the second application during the evaluation of the abstract syntax tree; and
return a result of the authorization request based on the evaluation of the abstract syntax tree to the first computing application,
wherein the communication with the second application comprises a security context for the client, wherein the security context comprises information on the client, the at least one resource associated with the request, and at least one permission associated with the at least one resource.

* * * * *